United States Patent [19]
Putz

[11] 3,756,098
[45] Sept. 4, 1973

[54] APPARATUS FOR SHAPING TUBES
[75] Inventor: Peter Putz, St. Polten, Austria
[73] Assignee: V. M. Voith A.G., Passauerstrasse, St. Polten, Austria
[22] Filed: Apr. 8, 1971
[21] Appl. No.: 132,409

[52] U.S. Cl............................ 82/2 R, 82/11, 82/46
[51] Int. Cl................................................ B23b 3/00
[58] Field of Search.......................... 82/2 E, 1.2, 11, 82/46, 48, 13, 2 R; 408/22, 26, 28, 117; 10/90, 107 PH

[56] References Cited
UNITED STATES PATENTS
3,152,394  10/1964  Miller et al. ..................... 408/26 X
2,486,977  11/1949  Peters................................ 82/2 E FOREIGN PATENTS OR APPLICATIONS
305,482  5/1955  Switzerland........................... 82/2 E Primary Examiner—Leonidas Vlachos
Attorney—Karl F. Ross

[57] ABSTRACT

A toolholder is mounted for rotation about an axis by toolholder-driving means. Work-holding means hold a pipe in a predetermined position centered on the axis. While the toolholder carries a cut-off tool and profiling tool means. Positioning means are operable to move the toolholder and work-holding means relative to each other in the direction of the axis to move the toolholder into and out of a pipe held in said predetermined position. Toolholder-feeding means are provided to move the toolholder radially outwardly relative to the axis during a rotation of the toolholder so that the profiling tool means machine a predetermined leading end portion of the pipe to a desired internal shape and the cut-off tool severs the leading end portion from the remainder of the pipe.

11 Claims, 12 Drawing Figures

Patented Sept. 4, 1973
3,756,098
4 Sheets-Sheet 1
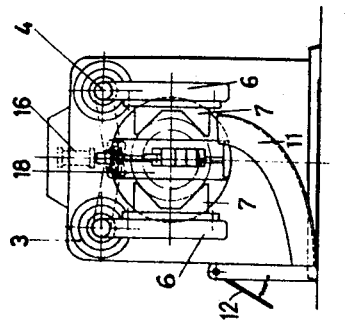
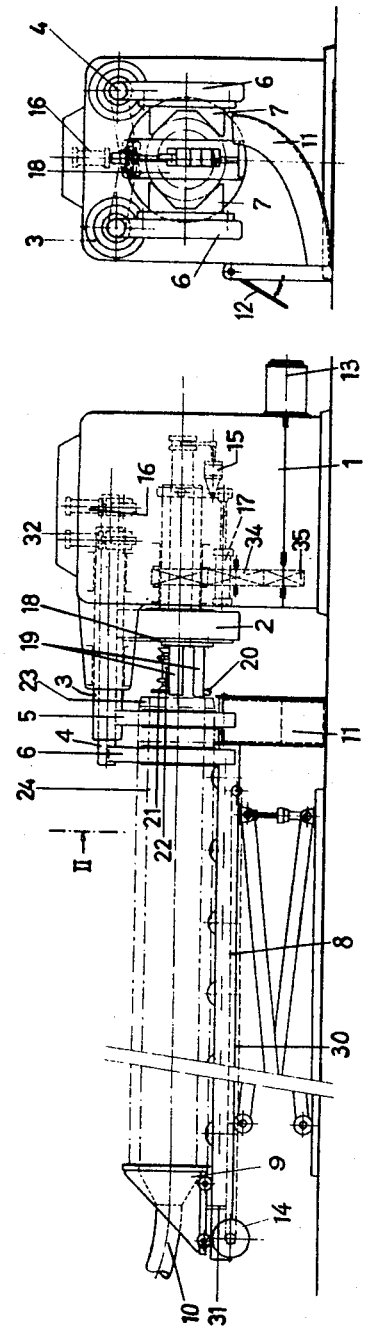
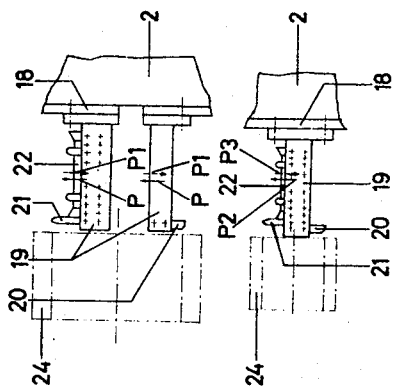
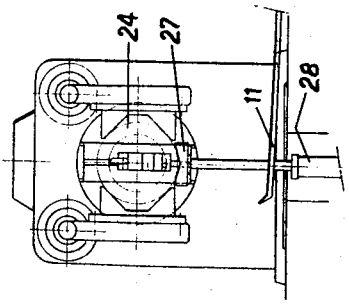
Peter PUTZ
INVENTOR.
BY Karl J. Ross
Attorney

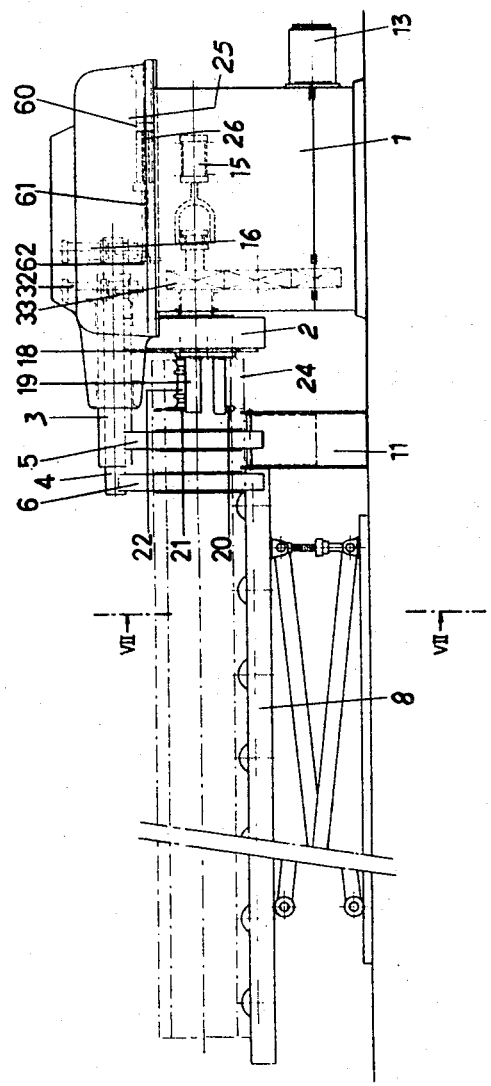
Peter PUTZ
INVENTOR.

Peter PUTZ
INVENTOR.

BY

Karl G. Ross

Attorney

APPARATUS FOR SHAPING TUBES

FIELD OF THE INVENTION

This invention relates to a process and apparatus for machining pipes by means of a driven rotary toolholder which carries at least one cut-off tool, by which sections are cut from a stationary pipe while the tool is moved outwardly.

BACKGROUND OF THE INVENTION

In known apparatus for machining metal pipes, the pipe to be machined is gripped in a stationary position and is cut off in an outward direction. This apparatus is not suitable, however, for machining asbestos-cement pipes or for the manufacture of sleeves from such pipes.

In a known process for making sleeves from asbestos-cement pipes which have been wound on a pipe-making machine, sections were severed from the pipes by means of an abrasive or other cut-off tool and were then turned as to the inside diameter on a facing lathe or an automatic lathe to the desired internal shape of the sleeve. As a production sequence, the removal of the sleeve blanks from the abrasive or other cut-off tools and the feeding of the sleeve blanks to the sleeve-turning lathe and the removal of the finished sleeves from the lathe involve serious problems because these steps must be performed almost exclusively by hand and a crane can be used only with pipes having relatively large nominal widths. For this reason, a plant for continuous production is costly. Besides, that production step requires not only employees who work directly at the machines but also an auxiliary worker and a conveyor at a fixed location.

SUMMARY OF THE INVENTION

These disadvantages will be avoided if, in accordance with the invention, the toolholder carries a cut-off tool, an optional pre-turning tool and one or more profiling tools for imparting to asbestos cement pipes the desired internal shape of the sleeve simultaneously with a cutting-off operation.

With such machine according to the invention, the sleeve may be pre-turned, profiled and cut off in one operation. This enables a saving of machinery and labor and a considerable reduction of the manufacturing time of the sleeves.

Processes are known in which the sleeve blanks are severed from asbestos cement pipes by a cut from the outside to the inside of the pipe. The process according to the invention differs from these known processes in that the sleeve is severed by a cut in the direction from the inside to the outside of the sleeve so that the latter can be profiled to its desired internal shape also during the cutting-off operation. Means which may be employed for this purpose are a facing head on which, in accordance with the invention, a set of tools are carried on a co-rotating slide rest. The workpiece consisting of the sleeve blank to be machined is stationary during the machining operation.

The process which has been mainly used so far and in which the tools were stationary and the asbestos cement pipe or sleeve blank was rotated does not permit of a cutting-off and profiling in one operation because the blanks inevitably depart from a straight line so that the position of the asbestos cement pipe to be machined cannot be checked exactly during the machining operation or such check is most difficult.

DESCRIPTION OF THE DRAWING

Further features and advantages of the invention will be explained with reference to the drawing, in which FIG. 1 is a side elevation showing an embodiment of the machine according to the invention and FIG. 2 is an elevation taken on line II—II of FIG. 1 with the pipe-feeding track removed.

FIG. 3 is a front elevation showing a lowering device for heavy sleeves.

FIGS. 4 and 5 show toolholders of machines for machining large and small sleeves, respectively.

FIG. 6 is a side elevation showing a different embodiment of the invention.

FIG. 7 is an elevation taken on line VII—VII in FIG. 6, again with the pipe-feeding track removed.

SPECIFIC DESCRIPTION

Figure 4A:
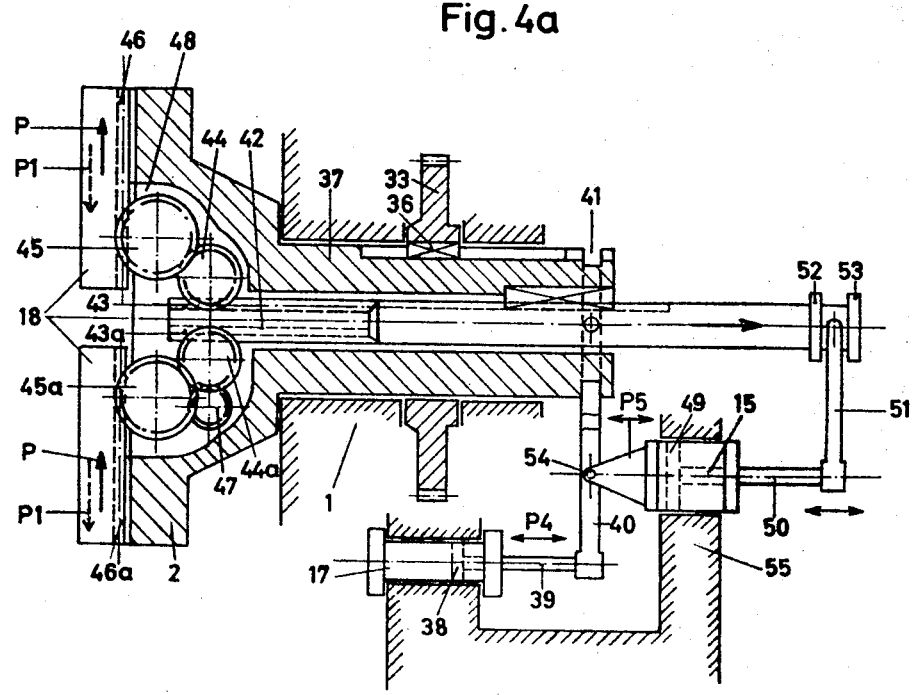
FIGS. 4a and 5a show with more detail the actuating means for the radial displacement of the toolholders for large and small sleeves in the apparatus shown in FIGS. 4 and 5, respectively, and the actuating means for imparting an axial movement to the facing head.

In the embodiment shown in FIGS. 1 and 2, the machine according to the invention comprises substantially a headstock 1, in which the facing head 2 and the shafts 3 and 4 which carry collets 5,6 are mounted. The collets are provided with gripping prisms 7. The facing head 2 is reciprocable in the longitudinal direction of the machine. The pipe to be machined is received by a vertically adjustable pipe-feeding track 8, which is provided with a pusher 9, to which a conduit 10 for sucking off chips is attached. A delivery track 11 provided with a snubbing flap 12 serves for the removal of the machined sleeves. There are also drive motors 13 and 14 for the facing head 2 and the pusher 9, respectively. The pre-turning tool 20, the cut-off tool 21 and the profiling tool 22 are secured to a toolholder 19, which protrudes from a slide rest 18, which is radially movable by an actuator 15. The collets 6 and 5 are operated by actuators 16 and 32, respectively, and an actuator 17 serves to impart an axial movement to the facing head 2 and the toolholders 19 carried by it.

This apparatus has the following mode of operation: The pipe intended for the manufacture of sleeves is placed on the pipe-feeding track 8. The same is vertically adjustable so that different pipes can be fed to the facing head 2 at the same center height. The pusher 9 is now displaced by the drive motor 14, e.g., by means of a chain 30 in engagement with a flight 31 which is secured to the pusher 9. As a result the pipe is pushed toward the facing head 2 to such an extent that the collet 5 which is nearer to the facing head holds their regularly shaped, leading end portion 23 of the pipe and the collet 6 which is remote from the facing head 2 holds the remaining pipe portion 24. The collets 6 and 5 are operated by pneumatic or hydraulic actuators 16, 32 so that any differences in diameter between different pipes will be compensated.

The toolholder 19 which is secured to the radially displaceable slide rest 18 of the facing head 2 and which carries the pre-turning tool 20, the cut-off tool 21 and the profiling tools 22 is then moved by means of the actuator 17 into the interior of the pipe only to such an extent that the cut-off tool 21 can cut off the irregulary shaped leading end portion 23 of the pipe when the slide rest 18 is radially outwardly moved by means of a pneumatic or hydraulic actuator 15.

When the irregularly shaped leading end portion 23 has been cut off, the toolholder 19 is axially retracted by the actuator 17. The collet 5 is opened so that the leading end portion 23 falls from the holding prisms 7 and tangentially impinges on the delivery track 11 and rolls on the latter laterally out of the machine under the snubbing flap 12. When the collet 6 is open, the pusher 9 is operated to advance the pipe to an extent which corresponds to the desired length of the sleeve plus the widths of the cut-off tool 21 and is then gripped in position by the collets 5 and 6.

The actuator 17 is then operated to move the constantly rotating facing head 2, which carries the toolholder 19, into the pipe in the axial direction of the machine. In this operation, the preturnig tool 20 removes the hard inner layer of the pipe. As soon as the toolholder 19 has been fully introduced, the actuator 15 is operated to move the slide rest 18 radially in a direction which is opposite to the direction in which the preturning tool 20 was engaged with the pipe. During this radial movement, the cut-off tool 21 begins to work first whereas the profiling tools 22 begin to operate as the radial movement is continued. When the sleeve has been shaped and cut off, the actuator 15 is operated to radially retract the slide rest 18 together with the toolholder 19 and the facing head 2 is axially moved away from the pipe by means of the actuator 17 so that the toolholder 19 is removed from the finished sleeve 24.

The collets 5 and 6 are now opened so that the finished sleeve 24 falls from the gripping prisms 7 onto the delivery track and laterally rolls out of the machine as has been described hereinbefore for the end portion 23. The pusher 9 is provided with a fitting for connection to a suction tube 10 for sucking off the chips which are formed by the machining operation. The pusher is now operated to advance the pipe again toward the facing head 2 and a new cycle of operations can begin when the collets 5,6 have been closed.

FIG. 4 shows the toolholder 19 which carries the preturning tool 21 and profiling tools 22 for an automatic machine for making large sleeves. This toolholder consists of two parts, which move in the radial direction in the same sense, as is indicated in FIG. 4 by arrows P and P1.

Figure 5A:
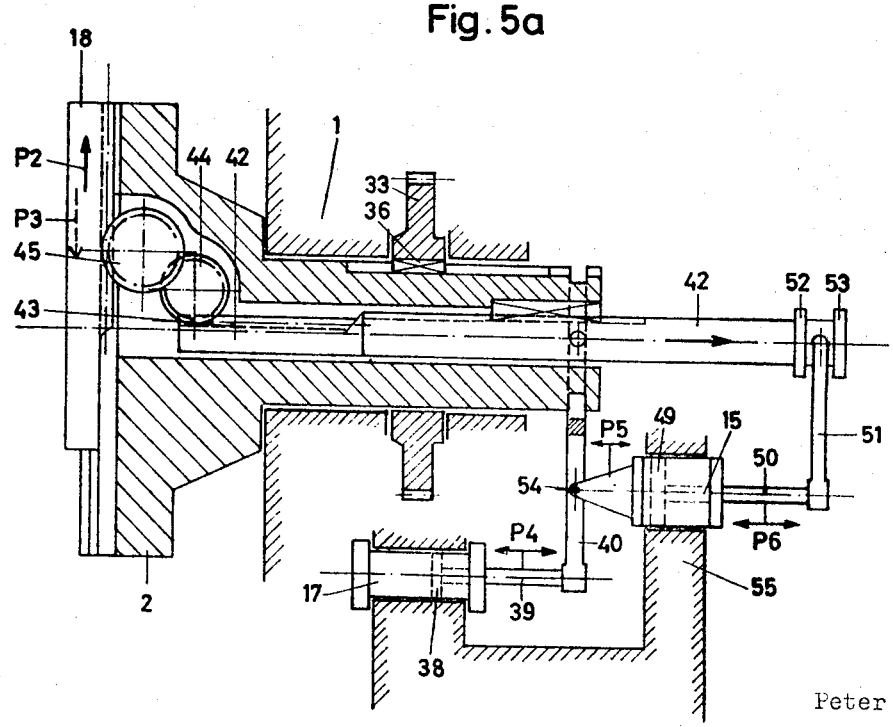

FIG. 5 shows a toolholder 19 having a pre-turning tool 20, a cut-off tool 21 and profiling tools 22 for an automatic machine for making small sleeves. This toolholder 19 consists of a single part and is movable in the direction of arrows P2 and P3. FIG. 1 shows a toolholder according to FIG. 4. Alternatively, a facing head 2 provided with a toolholder as shown in FIG. 5 may be used. FIGS. 4a and 5a show in greater detail the operation of the toolholders and their slide rests 18 and of the facing head 2. Rotation is imparted to the facing head by means of a gear 33, which is driven by the motor 13 by means of gears 34 and 35, as is apparent from FIG. 1 The gear 33 is non-displaceably mounted in the headstock 1 and is non-rotatably connected to the facing head 2 by a key 36, which extends into a longitudinal groove of a cylindrical extension 37 of the facing head 2. The facing head 2 is slidable in the direction of its axis of rotation relative to the driving gear 33. The facing head 2 is movable in the direction of its axis by an actuator 17, which comprises a slidably mounted piston 38 and a piston rod 39, to which an arm 40 is secured, which has a forked end remote from the piston rod 39. That forked end extends into an annular groove 41 of the cylindrical projection 37 of the facing head 2 so that the latter is freely rotatable. A movement of the piston 38 in the direction of the arrow P4 of the actuator 17 in the direction of the arrow P4 is transmitted to the same extend by the piston rod 39 and the arm 40 to the facing head 2. The actuator 17 is fixed in the headstock 1.

A rack 42 is mounted in a bore of the facing head 2 to be displaceable in the direction of the axis of rotation of the facing head 2.

In accordance with FIG. 4a, the rack 42 is provided on two diametrically opposite sides with teeth 43 and 43a, respectively. The teeth 43 are in mesh with a spur gear 44, which is in mesh with a gear 45, which is in mesh with rack teeth 46 formed on the rear side of that part of the slide rest 18 which is at the top in FIG. 4a. The second part of the slide rest 18 is shown at the bottom in FIG. 4a and provided on the rear also with rack teeth 46a, which are in mesh with a gear 45a. The gear 45a is driven, however, by an idler gear 47, which is in mesh with the gear 44a and the gear 45a. The gear 44a is in mesh with the rack teeth 43a and is clear of the gear 45a. The gears 44,45,44a,45a and 47 are rotatably mounted in a recess 48 of the facing head 2. Because the idler gear 47 is included in the means for transmitting power from the rack 42 to that part of the slide rest 18 which is at the bottom in FIG. 4a. The two parts of the slide rest 18 perform a radial movement in the same direction in FIG. 4 in response to a displacement of the rack 42 in the direction of the axis of rotation of the facing head 2. The arrangement shown in FIG. 5a is similar to that in FIG. 4a but the slide rest consists of one part only so that the gears 44a, 45a and 47 can be eliminated.

In the embodiments shown in FIGS. 4a and 5a, the rack 42 is operated by an actuator 15, which comprises a slidably mounted piston 49, which has a piston rod 50 that is rigidly connected to an actuating arm 51. The actuating arm 51 has a forked end which is remote from the piston rod 50 and which extends between two spaced apart enlarged portions 52, 53 of the rack 42 but does not hinder the rotation of the rack 42 during the rotation of the facing head 2.

The actuator 15 is secured by a pin 54 to the arm 40 of the piston rod 39 of the piston 38, which is movable in the actuator 17 and is slidably guided in a plain bearing 55 of the headstock 1 in the direction of the arrow P5. The actuator 15 and with it the piston rod 50, the arm 51 and the rack 42 can thus follow the movement performed by the piston rod 39 of the actuator 17 in response to an axial movement of the facing head 2. To effect a relative movement between the rack 42 and the facing head 2, the piston 49 of the actuator 15 is moved in the direction of arrow P6 whereas the piston 38 of the actuator is stationary. At this time, the actuator 15 bears by means of the pin 54 on the arm 40 of the piston rod 39 of the slidably movable piston 38 of the actuator 17.

FIGS. 6 and 7 show another embodiment of the present invention. Like parts are designated with the same reference numbers as in FIGS. 1 to 4, 4a and 5a. FIGS. 6 and 7 show a headstock 1 and a carriage 25, which is slidably mounted on the headstock 1 for reciprocation, in the longitudinal direction of the machine. Different from the embodiment described hereinbefore, the facing head is not slidable in the direction of its axis of rotation. The actuators 16 and 32 for actuating the collets 6 and 5 are secured in the carriage 25.

The pusher 9 for advancing the pipe is omitted in the embodiment of FIGS. 6 and 7. That machine comprises essentially the headstock 1, the facing head 2, the actuator 15 which is secured in the headstock 1 and controls the radial movement of the slide rest 18, the motor 13 for driving the facing head 2, the carriage 25, the actuator 26 for displacing the feeding carriage 25 in the direction of the axis of rotation of the facing head 2, the collet shafts 3 and 4, the collets 5 and 6 carried by the shafts 3 and 4, the gripping prisms 7 of the collets, the actuators 16, 32 for actuating the collets, the pipe-feeding track 8, the sleeve-delivering track 11 provided with the snubbing flap 12, the facing head slide rest 18 and the two-part toolholder 19, which carries the pre-turning tool 20, the cut-off tool 21 and the profiling tools 22. The radial movement of the slide rest 18 will be described hereinafter.

The machine has the following mode of operation: The pipe from which sleeves are to be made is applied to the pipe-feeding track 8 and is advanced by hand toward the collets 5 and 6 until the leading end portion of the pipe can be gripped by that collet which is nearer to the headstock 1. In that phase, the gripping carriage 25 is in its intermediate position, which is shown in FIG. 6 and which corresponds to the position of the slidably mounted piston 60 of the actuator 26 in the middle of the stroke. The actuator 26 is secured in the carriage 25 and the piston rod 61 of the piston 60 is secured to a mounting pin 62, which is secured to the headstock 1.

When the collets 5 and 6 have been actuated by the actuators 32 and 16, the pipe is advanced toward the facing head 2 to the extent of the length of the irregularly shaped leading end portion. To this end, the actuator 26 moves the carriage 25 in the longitudinal direction of the machine (to the right in FIG. 6). As a result, the toolholder 19 enters the interior of the pipe and is radially outwardly moved so that the cut-off tool 21 cuts off the leading end portion of the pipe. The feeding carriage 25 is then returned to its intermediate position. The collets 5 and 6 are opened and the leading end portion of the pipe rolls along the sleeve-delivering track 11 to the snubbing flap 12, which is raised by the impact so that the leading end portion rolls out of the machine laterally under the flap in a lateral direction.

The feeding carriage 25 is now advanced in the direction of the pipe (to the left in FIG. 6) by one sleeve length plus the width of the cut-off tool. The pipe is then clamped by the collets 5 and 6 and by a quick motion is moved toward the headstock 1 (to the right in FIG. 6) until the feeding carriage 25 is in its intermediate position. The pipe is then advanced at machining speed toward the headstock 1. In this operation, the pre-turning tool 20 removes the hard inner layer of the pipe. When the end position has been reached, the toolholder 19 is moved radially outwardly so that the cut-off tool 21 severs the sleeve from the remaining pipe and the profiling teeth 22 profile the internal shape of the sleeve. During that operation, the sleeve is held by the collet 5 and the remaining portion of the pipe by the collet 6. When the sleeve has been finished, the tools are radially retracted and the feeding carriage 25 is moved to its intermediate position. The collets open and the sleeve falls tangentially on the sleeve-delivering track 11 and under the snubbing flap 12 rolls out of the machine. The feeding carriage 25 then moves in the direction of the pipe (to the left in FIG. 6) and a new cycle of operation begins. The chips which have been formed are removed by a hood, which is mounted over the facing head and is not shown in the drawing.

With pipes having relatively large nominal widths, the difficulties may arise in the embodiment in which the pipe is advanced by two stations and retracted by one station in each cycle because large masses are to be moved. In that case, the mode of operation may be modified in that the feeding carriage 25 moves the pipe only to the extent of one station (like the pusher 9 in the embodiment described with reference to FIGS. 1 and 2), whereafter the facing head 2 is introduced into the stationary pipe. In that case, the facing head 2 must also be axially movable.

Figure 8:
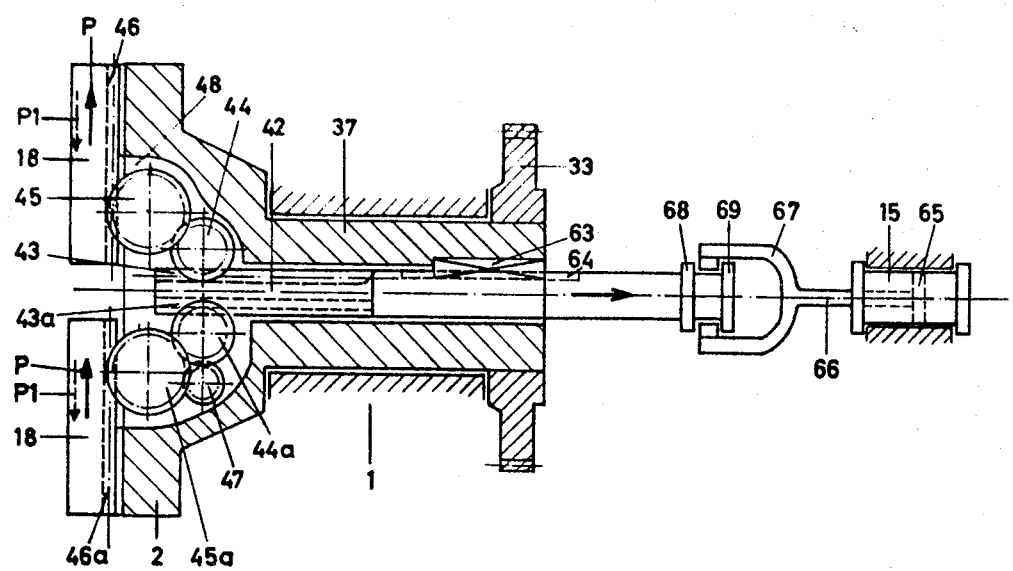
FIG. 8 shows in more detail the means for a radial movement of the toolholders 19 of the embodiment of FIGS. 6 and 7.

FIG. 8 shows in more detail the means for actuating the two-part slide rest 18 for the toolholder 19. From a comparison between FIGS. 8 and 4a it becomes apparent that the same arrangement of gears 44, 45, 44a, 45a, 47 for driving the parts of the slide rest 18 is used in both embodiments. Said gears are disposed in a recess 48 of the facing head 2. The gears 45 and 45a are in mesh with rack teeth 46, 46a, provided on the rear of the parts of the support 18. The gears 44 and 44a are driven by teeth 43 and 43a of the rack 42.

The facing head 2 is driven by the gear 33, which is secured to the cylindrical extension 37 of the facing head 2. The facing head is non-displaceably mounted in the headstock 1.

The rack is longitudinally slidably guided in the facing head 2, by a key 63, which extends into a longitudinal groove 64 of the rack 1 and serves to displace the rack 42 relative to the facing head 2 so that a radial movement is imparted to the parts of the slide rest 18 in the direction of the arrows P and P1, respectively.

The hydraulic or pneumatic actuator 15 comprises a piston 65, which has a piston rod 66, that has a forked end 67 remote from the piston 65. The forked end 67 extends between two enlarged flanges 68, 69 of the piston rod 42 so that any displacement of the piston 65 in the actuator 15 will result in a displacement of the rack 42 and in a movement of the parts of the slide rest 18 in the direction of arrows P and P1.

Figure 9:
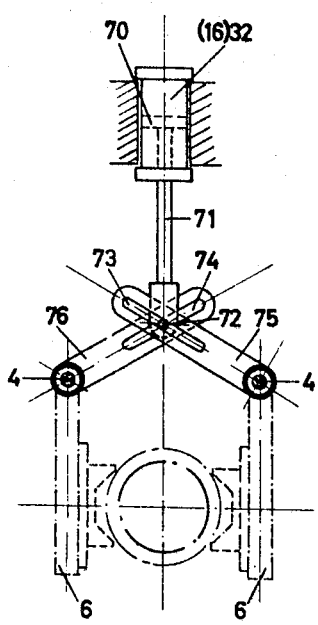
FIGS. 9 and 10 are a front elevation and top plan view, respectively, showing the operating means for the collets which are used in the machine according to FIGS. 1, 2 and 6 and 7.
Figure 10:
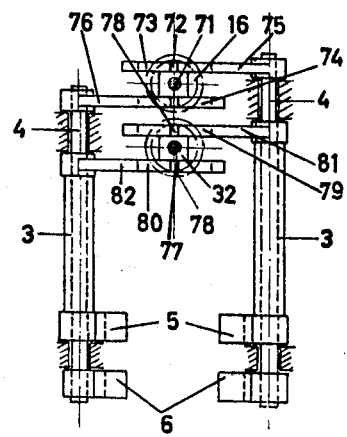

FIGS. 9 and 10 show in more detail the means for actuating the collets 5 and 6. That embodiment is used in the embodiment shown in FIGS. 1 and 2 and in that shown in FIGS. 6 and 7. The collet 6 is non-rotatably connected to the collet shaft 4. The collet shaft 4 is rotatably mounted in the headstock 1 in the embodiment shown in FIGS. 1 and 2 and rotatably mounted in the carriage 25 in the embodiment shown in FIGS. 6 and 7.

The collet shaft 4 extends through the hollow collet shaft 3, which is firmly connected to the collet 5. The collet shaft 4 is rotated by an actuator 16, which comprises a piston 70, which is slidable under the action of a hydraulic or pneumatic fluid which is supplied to the actuator in a controlled manner. At its end remote from the piston 70, the piston 71 has a pin 72, which extends into longitudinal slots 73, 74, which are mounted in links 75, 76, which are non-rotatably connected to the collet shaft 4. During a descent of the piston 70 in the cylinder 16, the link 75 performs a pivotal movement in the counter clockwise sense and the link 76 a pivotal movement in the clockwise sense so that the collet 6 is opened. Like the piston rod 71 of actuator 16, the piston rod 77 is provided with a pin 78 at its end remote from the actuator 32. That pin extends into longitudinal slots 79, 80 of links 81, 82, which are non-rotatably connected to the collet shafts 3. Just as a descent of the piston rod 71, a descent of the piston rod 77 results in a pivotal movement of the collets 5 in the opening sense.

FIG. 3 shows a pneumatic or hydraulic device for lowering heavy, large sleeves in the automatic sleeve-making machine. In that device, the sleeve 24 is carried by a prism 27 and by means of a pneumatic or hydraulic actuator 28 is lowered onto a sleeve-delivering track 11. That lowering device may be used in the apparatus shown in FIGS. 1 and 2 and in that according to FIGS. 6 and 7 instead of the delivering track 11 provided with the snubbing flap 12.

What is claimed is:

1. Apparatus for making sleeves from asbestos cement pipes, which apparatus comprises:
    a toolholder which is mounted for rotation about an axis,
    toolholder-driving means for rotating said toolholder about said axis,
    work-holding means for holding a pipe in a predetermined position centered on said axis,
    a cut-off tool carried by said toolholder and shiftable radially to pass through all of said pipe,
    profiling tool means carried by said toolholder,
    positioning means operable to move said toolholder and work-holding means relative to each other in the direction of said axis to move said toolholder into and out of a pipe held in said predetermined position, and
    toolholder-feeding means for moving said toolholder radially outwardly relative to said axis during a rotation of said toolholder so that said profiling tool means machine a predetermined leading end portion of said pipe to a desired internal shape and said cut-off tool cuts off said leading end portion from the remainder of said pipe, said toolholder-driving means comprising a facing head which is movable in the direction of said axis, and said toolholder-feeding means comprising a slide rest, which is radially adjustably mounted on said facing head and carries said toolholder.

2. Apparatus for making sleeves from asbestos cement pipes, which apparatus comprises:
    a toolholder which is mounted for rotation about an axis,
    toolholder-driving means for rotating said toolholder about said axis,
    work-holding means for holding a pipe in a predetermined position centered on said axis,
    a cut-off tool carried by said toolholder,
    profiling tool means carried by said toolholder,
    positioning means operable to move said toolholder and work-holding means relative to each other in the direction of said axis to move said toolholder into and out of a pipe held in said predetermined position, and
    toolholder-feeding means for moving said toolholder radially outwardly relative to said axis during rotation of said toolholder so that said profiling tool means machine a predetermined leading end portion of said pipe to a desired internal shape and said cut-off tool cuts off said leading end portion from the remainder of said pipe, said toolholder-driving means comprising an axially fixed facing head,
    said toolholder-feeding means comprising a slide rest radially adjustably mounted on said facing head and carries said toolholder,
    said apparatus including a headstock in which said facing head is rotatably mounted,
    said positioning means comprising a carriage slidably mounted on said headstock for movement in the direction of said axis, and
    said work-holding means being carried by said carriage and comprising a first collet for gripping said leading end portion of said pipe and a second collet for gripping said remaining portion of said pipe.

3. Apparatus as set forth in claim 2, in which said toolholder carries a pre-turning tool.

4. Apparatus as set forth in claim 2, in which said profiling tool means comprise a plurality of profiling tools.

5. Apparatus as set forth in claim 2, in which said profiling tool means succeed said cut-off tool in the direction of said relative movement to move said toolholder into said pipe.

6. Apparatus as set forth in claim 2, which comprises actuator means for operating said collets.

7. Apparatus for making sleeves from asbestos cement pipes, which apparatus comprises:
    a toolholder which is mounted for rotation about an axis,
    toolholder-driving means for rotating said toolholder about said axis,
    work-holding means for holding a pipe in a predetermined position centered on said axis,
    a cut-off tool carried by said toolholder,
    profiling tool means carried by said toolholder,
    positioning means operable to move said toolholder and work-holding means relative to each other in the direction of said axis to move said toolholder into and out of a pipe held in said predetermined position, and
    toolholder-feeding means for moving said toolholder radially outwardly relative to said axis during rotation of said toolholder so that said profiling tool means machine a predetermined leading end portion of said pipe to a desired internal shape and said cut-off tool cuts off said leading end portion from the remainder of said pipe, said apparatus further comprising a delivery track for receiving said leading end portion of said pipe when said end portion has been cut off and for permitting said cut-off leading end portion to roll automatically out of the machine.

8. Apparatus as set forth in claim 7, which comprises a snubbing flap which is associated with said delivery track to snub the movement of said leading end portion rolling on said track.

9. Apparatus as set forth in claim 7, in which said toolholder carries a preturning tool.

10. Apparatus as set forth in claim 7, in which said profiling tool means comprises a plurality of profiling tools.

11. Apparatus as set forth in claim 7, in which said profiling tool means succeeds said cut-off tool in the direction of said relative movement to move said toolholder into said pipe.

* * * * *